United States Patent

[11] 3,568,966

| [72] | Inventor | Ciro J. Lucci |
| | | 402 Foster Ave., Brooklyn, N.Y. 11230 |
| [21] | Appl. No. | 765,065 |
| [22] | Filed | Oct. 4, 1968 |
| [45] | Patented | Mar. 9, 1971 |

[54] LITTER BASKET MOUNTING AND LOCKING MEANS
5 Claims, 5 Drawing Figs.

[52] U.S. Cl................................................. 248/154
[51] Int. Cl..................................................... B65f 1/14
[50] Field of Search.................................. 248/154, (T.C.), 153, 203, 313; 292/192, 67, 106, 114; 211/4, 8; 248/154

[56] References Cited
UNITED STATES PATENTS

| 809,209 | 1/1906 | O'Connor..................... | 292/192 |
| 3,053,495 | 9/1962 | Schmier ........................ | 248/313 |
| 3,224,717 | 12/1965 | Mott............................... | 248/TC |

*Primary Examiner*—Edward C. Allen
*Attorney*—Jacobs and Jacobs

ABSTRACT: A wire or mesh screen litter basket is mounted by its top and bottom rims on a supporting post adapted to be anchored in the ground in such manner that the litter basket is maintained above ground level and can be locked in supported position from which it can be released only by unlocking with the proper key.

PATENTED MAR 9 1971
3,568,966
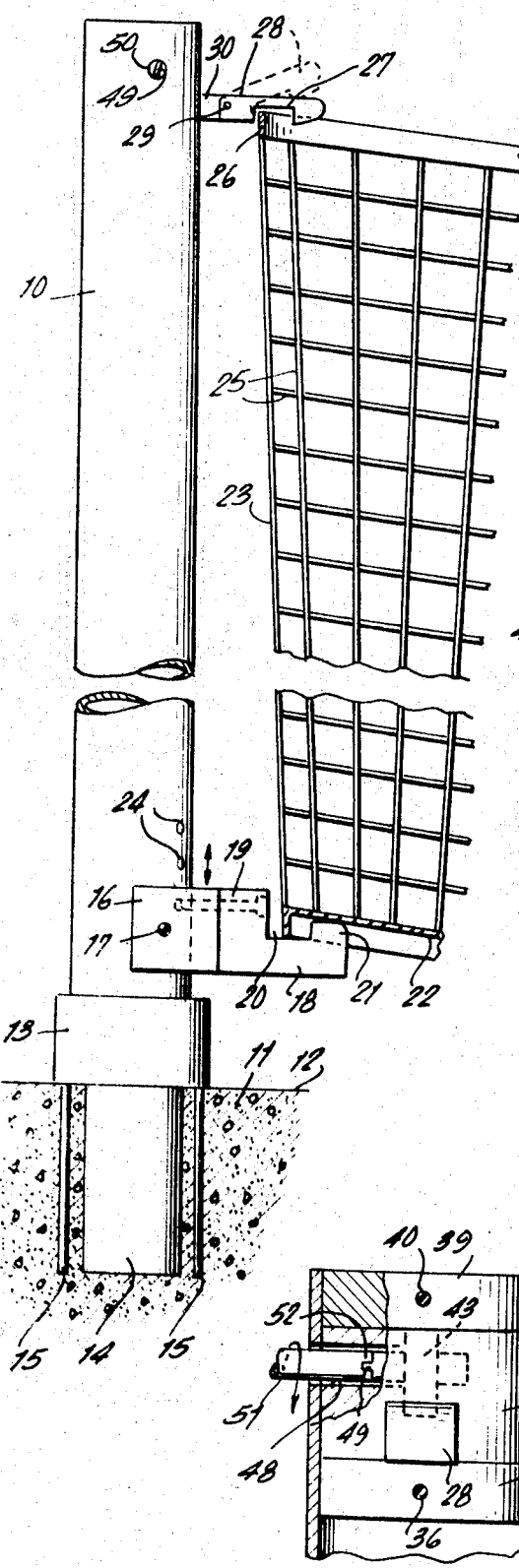
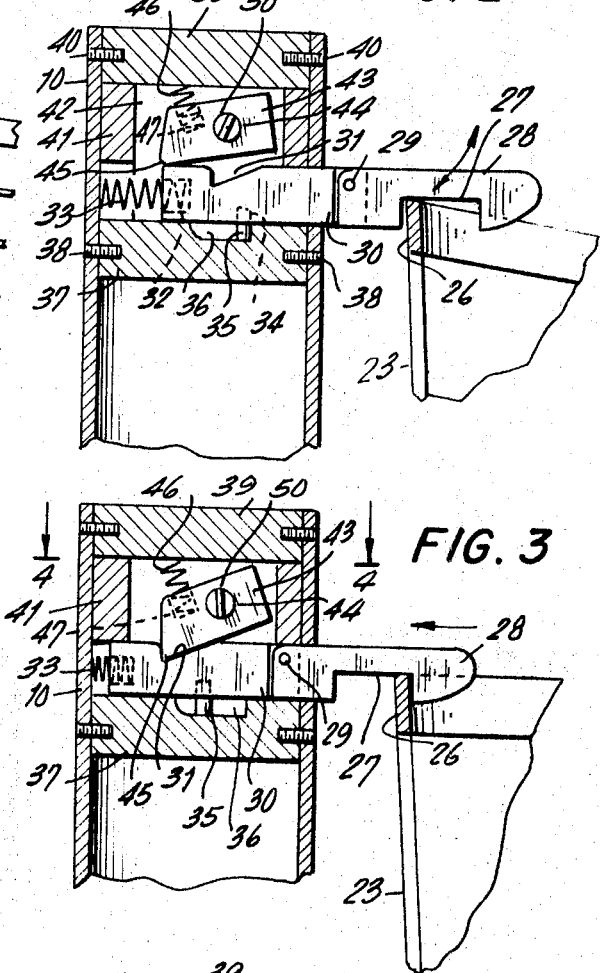
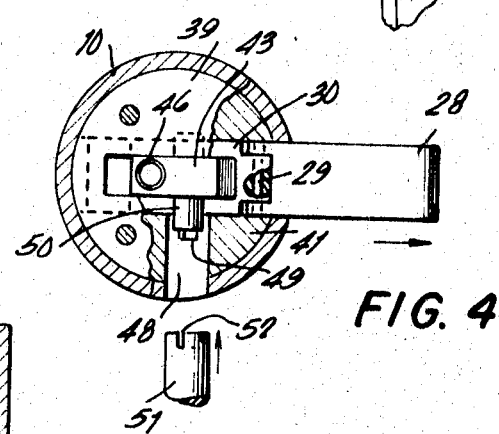
INVENTOR.
CIRO J. LUCCI
BY Jacobs & Jacobs
ATTORNEYS

LITTER BASKET MOUNTING AND LOCKING MEANS

The present invention relates to a litter basket made of wire or mesh screen having upper and lower annular rims by means of which it may be locked in position above ground level to a specially constructed hollow supporting post which is firmly anchored in the ground or in cement. The litter basket when in locked position cannot be removed except by one who has the proper key to unlock the mechanism provided in the supporting post.

A preferred embodiment of the invention is illustrated in the accompanying drawing in which:

FIG. 1 is an elevational view of the supporting post, a part of the litter basket and means for holding it is place;

FIG. 2 is a fragmentary sectional view on an enlarged scale taken through the upper portion of FIG. 1 and showing the mechanism within the supporting post in litter basket unlocking position;

FIG. 3 is a view similar to FIG. 2 but showing the mechanism in litter basket locking condition;

FIG. 4 is a transverse sectional view partly in plan taken on line 4-4 of FIG. 3; and FIG. 5 is a view of the upper portion of the supporting post of FIG. 1 at a 90° angle thereto with a portion broken away to expose certain parts of the internal construction and showing the key inserted in actuatable position.

Referring to the construction shown in the drawing, the supporting post 10 which is preferably hollow and which is made of stainless steel, chromium plated base metal or any other suitable metallic or nonmetallic material is solidly anchored in the ground either in earth or in cement as indicated at 11 with a portion of the post extending below ground level indicated at 12 in any suitable or desired manner with any appropriate subterranean extension so as to prevent the post from being readily removed. Preferably, the post has an enlarged collar portion 13 in contact with the ground level and to limit downward sinking of the post and that portion of the post below ground level is designated as 14 and may have auxiliary pieces 15 to aid in strength and rigidity.

Above the ground level 12 the post 10 is provided with an external arcuate bracket 16 fastened to the post by screws 17 or other suitable fastening instrumentality and this bracket 16 has a radially outwardly extending portion 18 which may be secured thereto, when the bracket is made in two pieces, by the countersunk screw 19 and is also provided with a recess 20 and a terminal upwardly extending portion 21 so that, as shown in FIG. 1, the lower annular rim 22 of litter basket 23 fits into said recess 20, the lower bracket forming a support for the litter basket, and depending upon the size of the litter basket, the bracket 16 may be varied in its vertical location on post 10 as will be understood from openings 24 through which the bracket may be fastened instead of in the position shown in FIG. 1. It will be observed further that the litter basket is supported above ground level thereby avoiding obstruction or interference with cleaning or washing of the ground or cement surface. The litter basket is preferably that shown as being made of intersecting or interwoven vertical and horizontal wires 25 and this construction is greatly preferred because it keeps the weight of the litter basket to a minimum and provides easy access to the interior whenever needed as in case of fire in the basket contents. The litter basket may, for example, be made of stainless steel wires, aluminum or any other lightweight strong but somewhat flexible and yieldable material.

At its upper end the litter basket has an annular rim 26 which fits into the recess 27 in the pivotal portion 28 pivoted at 29 to the bar 30 which extends through the wall of the post 10 into the interior thereof where the construction is as preferably shown in FIGS. 2 and 3. From these latter figures it will be seen that the bar 30 has on its upper edge intermediate its ends a notch 31 and an end counterbore 32 for the reception of one end of the helical spring 33, the other end of which abuts against the inner surface of the opposite wall of the post. The bar 30 is also provided with a recess 34 in its under edge for the reception of the upper portion of the vertical guide pin or rod 35 which is capable of moving with the bar to the extent permitted by the cavity or recess 36 in the upper surface of the lower transverse member 37 which is held in place within the post by means of screws or the like 38. It will be noted further that the longitudinal length of the bar 30 is less than the internal diameter of the hollow post 10 so that the bar 30 may move diametrically forwardly and backwardly within the post for locking and unlocking purposes as will be further explained below. There is also an upper transverse closure member 39 at or near the top of the post and held in position by screws or the like 40 and between the upper and lower transverse member 39 and 37 there is an annular spacer element 41 which maintains the relative positions of the parts and provides the space 42 within which locking and unlocking action takes place. In this space 42 there is disposed a locking link 43 pivotally mounted at 44 and so arranged that it is set at a slight angle to the bar 30, the locking link 43 being of generally trapezoidal shape so that it has a lowermost inner corner portion 45 which can either slide along the upper edge of the bar 30 or which can drop into the notch 31 for locking purposes as shown in FIG. 3, it being particularly noted also that link 43 is spring-urged in counterclockwise direction toward locking position by means of the helical spring 46 one end of which is received in a recess 47 in the upper edge of link 43 and the other end of which abuts against the under surface of the upper transverse closure member 39. A comparison of FIGS. 2 and 3 clearly shows how the various described parts move and their acquired relationship when either in the unlocking position of FIG. 2 in which member 28 can be manually pivoted upwardly or in the locking position of FIG. 3 in which member 28 cannot be pivotally moved upwardly into basket releasing position.

From FIGS. 4 and 5 it will be seen that there is a radial opening 48 through member 41 giving access to a ridge or protuberance 49 on a cylinder 50 which can undergo limited rotative movement to actuate link 43 between locking and unlocking positions and these positions are obtained through the use of the key or keylike member 51 shown in part in FIG. 4 and also in FIG. 5 where its rotatable character is apparent, it being clear that the locking and unlocking is carried out by, for example, clockwise rotation of key 51 in receptive or interfitting contact with protuberance 49 for unlocking (arrow/FIG. 5), the contacting surfaces being complementarily configured so that one is raised and the other is recessed. The particular arrangement shown in FIG. 4 has a recessed or counterbored portion 52 in the end of key 51 for the reception of protuberance 49 on cylinder 50.

It is believed that the foregoing description will make it clear how the device is operated. Assuming the parts to be in locking condition as in FIG. 3, the key 51 is inserted in the radial recess 48 into contact with protuberance 49 and the key member rotated which causes the corner portion 45 of link 43 above described to move out of the notch 31 thereby permitting it to slide along the upper surface of part 30 whereupon the spring 33 urges bar 30 radially outwardly to the position shown in FIG. 2 in which position the pivotal portion 28 can be manually pivoted upwardly around pivot 29 thereby freeing the upper rim of basket 23 and permitting the basket to be removed for emptying or cleaning or replacement. When the parts are to be locked, the basket is repositioned and then it is only necessary to apply an inward force by hand to pivotal portion 28 thereby causing bar 30 to retract within the post 10 compressing spring 33 and the corner portion 45 of link 43 to drop into the notch 31 under which conditions the device is locked so that the litter basket cannot be unauthorizedly removed.

It is understood that the foregoing is intended as illustrative and not as limitative and that within the spirit and scope of the appended claims modifications may be made as to details of construction and sizes and shapes.

I claim:

1. Litter basket mounting and locking means comprising, in combination, a litter basket having top and bottom annular rims, a hollow supporting post adapted to be anchored in the ground, a fixed bracket mounted externally on said post above ground level and having an extension projecting therefrom with a recess in its upper surface for the reception of the bottom rim of the litter basket, a bar mounted within the post near the upper end thereof and less in length than the internal diameter of the post, said bar being movable diametrically with respect to the post, an outer portion pivoted to the bar and extending radially outwardly therefrom and having a recess in its lower edge for the reception of the top rim of the litter basket, means in the post for normally guidedly urging the bar outwardly in a radial direction in which position the outer portion is positioned completely outside said post and is pivotable upwardly to permit disengagement of the litter basket from the post and replacement thereof for relocking purposes, the bar being manually retractable into the post in which position the pivotal connection to the outer portion is concealed and locked within the post and the litter basket is locked in supported position, and means to retain said bar in its retracted position.

WHAT IS CLAIMED IS:

2. Litter basket mounting and locking means according to claim 1 in which the bar is provided with a notch in its upper edge and a locking link is pivotally disposed above the bar with a corner portion receivable in the notch for locking purposes, and a key engageable with a protuberance on the pivot for unlocking purposes.

3. Litter basket mounting and locking means according to claim 2, in which the upper interior portion of the post has upper and lower spaced transverse members with an annular spacing member therebetween defining a cavity in which the locking link is located, said annular member having a radial opening giving key-access to the pivot of said pivotable link on which a protuberance is formed for moving the parts to unlocked condition.

4. Litter basket mounting and locking means according to claim 3 in which the lower transverse member is provided with a recess in its upper surface in which a vertical guide pin is adapted to move with the bar and the upper end of which pin fits into the underside of the bar.

5. Litter basket mounting and locking means according to claim 4 in which the bar is spring-urged outwardly with respect to the post by a helical spring one end of which abuts the inner post surface and the other end of which fits into an end of the bar and the locking link is urged in counterclockwise direction by a helical spring one end of which abuts the under surface of the upper transverse member and the other end of which fits into the upper edge of the locking link.